United States Patent Office 3,108,110
Patented Oct. 22, 1963

3,108,110
1-[N-LOWER ALKYL-PIPERIDYL-(4')] - 3 - PHENYL-4 - (PARASUBSTITUTED BENZYL) - PYRAZOLONES-(5)
Ernst Jucker, Binningen, Basel-Land, Adolf J. Lindenmann, Basel, and John Gmünder, Muttenz, Basel-Land, Switzerland, assignors to Sandoz Ltd. (also known as Sandoz A.G.), Basel, Switzerland, a Swiss firm
No Drawing. Filed Mar. 31, 1961, Ser. No. 99,692
Claims priority, application Switzerland Apr. 22, 1960
8 Claims. (Cl. 260—294)

The present invention relates to new pyrazolone derivatives, their non-toxic, therapeutically useful salts with acids, and a process for their manufacture.

The new pyrazolone derivatives of the present invention correspond to the Formula I,

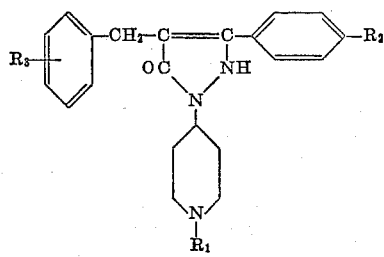

wherein $R_1$ stands for a lower alkyl, $R_2$ stands for a member selected from the group consisting of hydrogen and halogen, and $R_3$ stands for a member selected from the group consisting of halogen, lower alkoxy and nitro.

The new compounds of Formula I of the present invention are advantageously prepared by reacting an appropriate hydrazine of the Formula II,

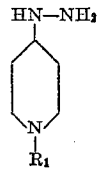

wherein $R_1$ has the precedingly-recited significance, with a β-keto-carboxylic acid derivative of the Formula III,

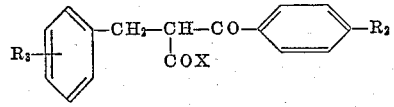

wherein $R_2$ and $R_3$ have the precedingly-recited significance, and X is a member selected from the group consisting of hydroxy and lower alkoxy.

Examples of particularly suitable meanings for the radical $R_1$ are methyl, ethyl, propyl or isopropyl, for the radical $R_2$ chlorine or bromine, and for the radical $R_3$ chlorine, bromine, iodine, fluorine, or a lower alkoxy group, such as methoxy, ethoxy, propoxy, isopropoxy or butoxy.

One method of carrying out the process of the present invention is as follows: An N-alkylpiperidyl-4-hydrazine of Formula II is mixed with a compound of Formula III and the resulting mixture is heated for several hours. The alcohol and water formed during the condensation are removed in a vacuum. Purification of the condensation product may be effected in known manner, for example by recrystallization.

It is also possible to effect the condensation in the process of the invention in the presence of a suitable organic solvent, for example glacial acetic acid.

Most of the pyrazolone derivatives of Formula I above are crystalline at room temperature. They are basic compounds which form, with a wide variety of inorganic and organic acids, water-soluble salts which are crystalline at room temperature. Thus, for example, with hydrochloric, hydrobromic, hydriodic, tartaric, oxalic, maleic, acetic, fumaric acids, etc., they form the corresponding hydrochlorides, hydrobromides, hydriodides, tartrates, oxalates, maleinates, acetates, fumarates, etc.

The new pyrazolone derivatives of the invention and their salts are highly suitable, on the basis of their pharmacodynamic properties, for a variety of therapeutic uses, since they have a wide spectrum of activity. Thus, while being of low toxicity, they have antiphlogistic, analgetic, antipyretic, narcosis-potentiating, and temperature-reducing activities and, more especially, a specific anti-rheumatic activity. In addition, some of the compounds have a noteworthy serotonin-inhibiting activity.

Since the new pyrazolone derivatives of the Formula I are very easily convertible into water-soluble salts of inorganic and organic acids, there are thus made available for therapy pyrazolone derivatives which are distinguished by very good resorbability and which can thus be administered per os, e.g. in the form of tablets. In addition, there is thus very simply made possible the preparation of highly concentrated solutions which in many cases are indispensable for parenteral "stoss" therapy. In addition, the new compounds of Formula I, prepared according to the present invention, are also useful as intermediates for the preparation of therapeutically useful products.

Those of the compounds of Formula III used as starting materials in the instant invention which are hitherto unknown may be produced using known methods, i.e. a suitable benzoylacetic acid ethyl ester which may be substituted in the p-position of the phenyl group with a halogen atom, is condensed with a suitably substituted benzyl chloride in the presence of an alkaline condensation agent, e.g. potassium tert.-butylate, the required keto-carboxylic acid ester resulting thereby being isolated.

In the following examples which illustrate the invention without limiting it, all the temperature references are in degrees centigrade. The melting and boiling points are corrected.

EXAMPLE 1

*1-[N-Methyl-Piperidyl-(4')]-3-Phenyl-4-(p-Fluorobenzyl)-Pyrazolone-(5)*

33.0 g. of p-fluorobenzyl-benzoyl acetic acid ethyl ester and 14.0 g. of N-methyl-piperidyl-4-hydrazine are heated to a temperature of 120° in an open flask and kept at this temperature for 3 hours. For completing the reaction the same temperature is maintained for another ½ hour in a vacuum of 12 mm. Hg. The condensation product, viz. the 1-[N-methyl-piperidyl-(4')]-3-phenyl-4-(p-fluorobenzyl)-pyrazolone-(5), after having been recrystallised from methanol/ether (3:2), melts at 168–170°.

The p-fluorobenzyl-benzoyl acetic acid ethyl ester used as a starting material is prepared as follows: Whilst cooling, 76.8 g. of benzoyl acetic acid ethyl ester and 63.6 g. of p-fluorobenzyl chloride are added consecutively dropwise to a solution of 17.1 g. of potassium in 150 cc. of abs. tert. butanol, and the reaction mixture is kept overnight at a temperature of 90°. 150 cc. of ice water are added to the ice-cooled condensation product which is then extracted three times each with 500 cc. of ether. The combined ethereal extracts are washed with a saturated solution of sodium hydrogen carbonate and distilled water, dried over magnesium sulphate, and evaporated in a vacuum. The oily residue is distilled in a vacuum of 0.02 mm. Hg, and the p-fluorobenzyl-benzoyl acetic acid ethyl ester comes over at 174–175°.

EXAMPLE 2

1-[N-Methyl-Piperidyl-(4')]-3-Phenyl-4-(p-Chlorobenzyl)-Pyrazolone-(5)

A mixture of 6.3 g. of p-chlorobenzyl-benzoylacetic-acid-ethyl ester and 2.6 g. of N-methyl-piperidyl-4-hydrazine is kept at a temperature of 120° in an open flask for 4 hours, the temperature being thereafter maintained at the same level for another hour in a 12 mm. Hg vacuum. After having cooled, the condensation product, viz. the 1-[N-methyl-piperidyl-(4')]-3-phenyl - 4 - (p-chlorobenzyl)-pyrazolone-(5), is recrystallised from acetic acid ethyl ester. M.P. 166–168°.

EXAMPLE 3

1-[N-Methyl-Piperidyl-(4')]-3-Phenyl-4-(p-Methoxybenzyl)-Pyrazolone-(5)

27.5 g. of p-methoxybenzyl-benzoyl acetic acid ethyl ester are condensed in an open flask at 120° with 11.4 g. of N-methyl-piperidyl-4-hydrazine, the temperature being maintained for another ½ hour in a 12 mm. Hg vacuum to complete the reaction. After having cooled, the condensation product, viz. the 1-[N-methyl-piperidyl-(4')]-3-phenyl-4-(p-methoxybenzyl)-pyrazolone-(5) is recrystallised from acetic acid ethyl ester/chloroform (1:1). M.P. 174–175°.

The p-methoxybenzyl-benzoyl acetic acid ethyl ester used as a starting material is prepared as follows: 76.8 g. of benzoyl acetic acid ethyl ester and 69.0 g. of p-methoxybenzyl chloride are added dropwise consecutively to a solution of 9.16 g. of sodium in 100 cc. of abs. ethanol and the reaction mixture is boiled at reflux for 16 hours. After the mixture has been cooled with ice, 150 cc. of water are added and the reaction solution is extracted three times each with 300 cc. of ether. The combined ethereal extracts are washed with a saturated solution of sodium hydrogen carbonate and water, dried over magnesium sulphate and evaporated in a vacuum. The oily residue is distilled at a pressure of 0.2 mm. Hg, the p-methoxybenzyl-benzoyl-acetic - acid - ethyl ester coming over at 192–194°.

EXAMPLE 4

1-[N-Methyl-Piperidyl-(4')]-3-Phenyl-4-(p-Nitrobenzyl)-Pyrazolone-(5)

A solution of 32.7 g. of p-nitrobenzyl-benzoyl-acetic acid ethyl ester and 25.8 g. of N-methyl-piperidyl-4-hydrazine in 100 cc. of glacial acetic acid is maintained at a temperature of 120° for 8 hours. After the solvent has been removed in a vacuum, 100 cc. of a 2 N hydrochloric acid are added to the residue. The crystalline precipitate is filtered off, washed with water, dried in a vacuum and then further purified by suspending it three times each in 100 cc. of acetic acid ethyl ester and filtering off. After having been recrystallised from methanol/water (2:1) the 1-[N-methyl-piperidyl-(4')]-3-phenyl-4-(p-nitro-benzyl)-pyrazolone - (5) - hydrochloride-trihydrate melts at 116–117°.

EXAMPLE 5

1-[N-Methyl-Piperidyl-(4')]-3-(p-Chlorophenyl)-4-(p-Fluorobenzyl)-Pyrazolone-(5)

58.5 g. of p-fluorobenzyl-(p-chlorobenzoyl) acetic acid ethyl ester and 26.0 g. of N-methyl-piperidyl-4-hydrazine in 150 cc. of glacial acetic acid are maintained at 120° for 8 hours. The reaction solution is boiled down in a vacuum and 100 cc. of a 2 N hydrochloric acid are then added to the viscous residue. The crystalline precipitate is filtered off, well dried in a vacuum and then shaken out three times each with 100 cc. of ether, the unchanged p-fluorobenzyl-(p-chlorobenzoyl) acetic acid ethyl ester dissolving in the ether. 75 cc. of a saturated solution of sodium hydrogen carbonate and 100 cc. of acetic acid ethyl ester are added to the ether-insoluble residue. The resulting pyrazolone dihydrate soon begins to crystallise from the clear two-phase reaction mixture. It is filtered off and recrystallised from methanol/water (2:1). Double M.P. 117–119 and 160–162°.

The anhydrous pyrazolone derivative is obtained by exposing the dihydrate to a temperature of 100° in a high vacuum for 2 hours. The compound has a double M.P. of 110 and 162–163°.

The p-fluorobenzyl-(p-chlorobenzoyl) acetic acid ethyl ester used as a starting substance is obtained as follows: 90.5 g. of p-chlorobenzoyl acetic acid ethyl ester and 63.6 g. of p-fluoro-benzyl chloride are carefully added dropwise and consecutively to a solution of 17.1 g. of potassium in 150 cc. of abs. tert. butanol. After having been kept at 80° for 16 hours the reaction mixture is cooled in ice, 150 cc. of ice water are added and the mixture is slightly acidified with a 2 N sulphuric acid. The reaction mixture is extracted three times each with 500 cc. of ether and the ethereal extracts are washed with a saturated solution of sodium hydrogen carbonate and with water. The ethereal solutions are dried over magnesium sulphate and then evaporated in a vacuum. The oily residue is distilled in a high vacuum, the p-fluorobenzyl-(p-chlorobenzoyl) acetic acid ethyl ester coming over between 185 and 191° at a pressure of 0.05–0.25 mm. Hg and crystallising as it cools. M.P. 73–74°.

EXAMPLE 6

1-[N-methyl-Piperidyl-(4')]-3-(p-Chlorophenyl)-4-(p-Chlorobenzyl)-Pyrazolone-(5)

28.1 g. of p-chlorobenzyl-(p-chlorobenzoyl) acetic acid ethyl ester and 20.7 g. of N-methyl-piperidyl-4-hydrazine in 75 cc. of glacial acetic acid are maintained at 120° for 8 hours. 100 cc. of a 2 N hydrochloric acid are added to the viscous residue which remains after evaporation in a vacuum, the crystalline precipitate being filtered off and well dried in a vacuum. The crystalline mass is shaken out three times each with 100 cc. of ether, the unchanged p-chlorobenzyl-(p-chlorobenzoyl) acetic acid ethyl ester dissolving in the ether. 75 cc. of a saturated solution of sodium hydrogen carbonate and 100 cc. of ether are added to the ether-insoluble residue. Soon the resulting pyrazolone dihydrate begins to crystallise from the clear two-phase reaction mixture. The dihydrate is filtered off and recrystallised from methanol/water. M.P. 130° (decomp.) The anhydrous pyrazolone derivative is obtained by heating the dihydrate to 100° in a high vacuum for 2 hours. M.P. 130°. The p-chlorobenzyl-(p-chlorobenzoyl) acetic acid ethyl ester used as a starting material is prepared as follows: 90.5 g. of p-chlorobenzoyl acetic acid ethyl ester and 70.8 g. of p-chloro-benzyl chloride are carefully added dropwise and consecutively to a solution of 17.1 g. of potassium in 150 cc. of abs. tert. butanol. After keeping the temperature at 80° for 23 hours the reaction mixture is cooled on ice. 150 cc. of ice water are added and the mixture is slightly acidified with a 2 N sulphuric acid. The reaction mixture is extracted three times each with 500 cc. of ether, and the ethereal extracts are washed with a saturated solution of sodium hydrogen carbonate and with water. The ethereal solutions are dried over magnesium sulphate, combined and evaporated in a vacuum. The residue is distilled in a high vacuum, and the p-chlorobenzyl-(p-chlorobenzoyl) acetic acid ethyl ester comes over at a pressure of 0.03–0.15 mm. Hg between 200 and 210°. M.P. 49.5–51.5°.

EXAMPLE 7

1-[N-Methyl-Piperidyl-(4')]-3-Phenyl-4-(p-Bromobenzyl)-Pyrazolone-(5)

7.2 g. of p-bromobenzyl-benzoyl acetic acid ethyl ester and 5.2 g. of N-methyl-piperidyl-4-hydrazine in 20 cc. of glacial acetic acid are maintained at 120° for 8 hours. After evaporation of the glacial acetic acid in a vacuum 20 cc. of a 2 N hydrochloric acid are added to the residue. The crystalline precipitate is filtered off to remove remaining traces of β-keto ester, extracted three times each with 75 cc. of ether and then thoroughly shaken with a saturated solution of sodium hydrogen carbonate. The resulting pyrazolone derivative is filtered off, thoroughly rewashed with water and crystallised from methanol/water. The air-dried monohydrate has a double melting point at 97–100 and 178–179°.

The p-bromobenzyl-benzoyl acetic acid ethyl ester used as a starting substance is obtained as follows: Whilst cooling with ice, a solution of 90.5 g. of p-bromobenzyl chloride in 76.8 g. of benzoyl acetic acid ethyl ester is introduced into a solution, cooled to room temperature, of 17.1 g. of potassium in 150 cc. of abs. tert. butanol. The mixture is then heated and maintained at 80° for 18 hours, followed by cooling in an ice bath. 150 cc. of ice water are added to the condensation product which is adjusted to pH value 6 with a 2 N sulphuric acid and then extracted three times each with 500 cc. of ether. The combined ethereal extracts are washed with an aqueous solution of sodium hydrogen carbonate and water, dried over magnesium sulphate and evaporated in a vacuum. The residue is distilled at a pressure of 0.03 mm. Hg, the p-bromobenzyl-benzoylacetic acid ethyl ester coming over between 184 and 187° and crystallising when it cools down. M.P. 58–59° from methanol.

EXAMPLE 8

1-[N-Isopropyl-Piperidyl-(4')]-3-Phenyl-4-(p-Fluorobenzyl)-Pyrazolone-(5)

3.34 g. of N-isopropyl-piperidyl-4-hydrazine and 6.3 g. of p-fluorobenzyl-benzoyl acetic acid ethyl ester in 25 cc. of glacial acetic acid are refluxed for 24 hours. After removal of the glacial acetic acid in a vacuum 25 cc. of a 16% aqueous hydrochloric acid solution are added to the residue which is then shaken out with acetic acid ethyl ester to remove all remaining traces of β-keto ester. The hydrochloric phase is adjusted to pH 8–9 with a 50% solution of caustic potash and exhaustively extracted with acetic acid ethyl ester. The acetic acid ethyl ester phases are dried over magnesium sulphate, evaporated in a vacuum and the residue is crystallised from water. M.P. 158–159°.

EXAMPLE 9

1-[N-Methyl-Piperidyl-(4')]-3-Phenyl-4-(o-Chlorobenzyl)-Pyrazolone-(5)

31.7 g. of o-chlorobenzyl-benzoyl acetic acid ethyl ester and 14.2 g. of N-methyl-piperidyl-4-hydrazine are heated and maintained at 120° in an open flask for 3 hours and then for a further 30 minutes under 15 mm. Hg pressure. A 2 N hydrochloric acid is added until the residue gives a strong acid reaction and this is extracted three times each with 100 cc. of acetic acid ethyl ester. The acetic acid ethyl ester extracts are washed with dilute hydrochloric acid and the combined acid extracts adjusted to pH 8 with a 50% solution of caustic potash whilst being cooled with ice. The separated oil is taken up in acetic acid ethyl ester and the aqueous phase is removed. The 1-[N-methyl-piperidyl-(4')]-3-phenyl-4-(o-chlorobenzyl)-pyrazolone-(5) soon begins to crystallise from the acetic acid ethyl ester solution. M.P. 186–190° (decomp.) from methanol.

The o-chlorobenzyl-benzoyl acetic acid ethyl ester used as a starting substance is prepared as follows: A mixture of 70.8 g. of o-chlorobenzyl chloride and 76.8 g. of benzoyl acetic acid ethyl ester is added dropwise to a warmed solution of 17.1 g. of potassium in 150 cc. of abs. tert. butanol, the mixture being maintained at 80° for 20 hours and then cooled on an ice bath. 150 cc. of ice water are added and the pH value of the reaction mixture is adjusted to 6 with a 2 N sulphuric acid. It is then extracted three times each with 500 cc. of ether, the ethereal solutions are washed with water, dried over magnesium sulphate and the ether is finally driven off. By distilling the residue the o-chlorobenzyl-benzoyl acetic acid ethyl ester of M.P. 173–176° at 0.04 to 0.08 mm. Hg is obtained.

EXAMPLE 10

1-[N-Methyl-Piperidyl-(4')]-3-Phenyl-4-(o-Chlorobenzyl)-Pyrazolone-(5)

14.0 g. of o-chlorobenzyl-benzoyl acetic acid (M.P. 85–93° decomp.) in 12 cc. of chloroform and 6.5 g. of N-methyl-piperidyl-4-hydrazine are heated to a temperature of 110° in course of 30 minutes in an open flask and then kept for 3 hours at 120°, this temperature being maintained for another 30 minutes in a vacuum of 15 mm. Hg. The further procedure is as described in Example 9. After recrystallisation from methanol the resulting pyrazolone derivative melts at 186–190° (decomp). The mixed melting point with the compound obtained from o-chlorobenzyl-benzoyl acetic acid ethyl ester and N-methyl-piperidyl-4-hydrazine shows no depression.

Having thus disclosed the invention, what is claimed is:

1. A member selected from the group consisting of compounds of the Formula I

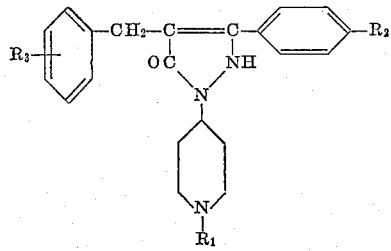

and the non-toxic, therapeutically useful acid addition salts thereof, wherein $R_1$ stands for alkyl having from 1 to 4 carbon atoms, $R_2$ stands for a member selected from the group consisting of hydrogen and halogen, and $R_3$ stands for a member selected from the group consisting of halogen, lower alkoxy and nitro.

2. 1 - [N - methyl - piperidyl - (4')] - 3 - phenyl - 4- (p-fluorobenzyl)-pyrazolone-(5).

3. 1 - [N - methyl - piperidyl - (4')] - 3 - phenyl - 4- (p-chlorobenzyl)-pyrazolone-(5).

4. 1 - [N - methyl - piperidyl - (4')] - 3 - phenyl - 4- (p-methoxybenzyl)-pyrazolone-(5).

5. 1 - [N - methyl - piperidyl - (4')] - 3 - phenyl - 4- (p-nitrobenzyl)-pyrazolone-(5).

6. 1 - [N - methyl - piperidyl - (4')] - 3 - phenyl - 4- (p-bromobenzyl)-pyrazolone-(5).

7. 1 - [N - isopropyl - piperidyl - (4')] - 3 - phenyl - 4- (p-fluorobenzyl)-pyrazolone-(5).

8. 1 - [N - methyl - piperidyl - (4')] - 3 - phenyl - 4- (o-chlorobenzyl)-pyrazolone-(5).

References Cited in the file of this patent

FOREIGN PATENTS

| | | |
|---|---|---|
| 561,695 | Belgium | Apr. 17, 1958 |
| 563,800 | Belgium | July 8, 1958 |
| 565,761 | Belgium | Sept. 15, 1958 |